United States Patent

Takahashi et al.

[11] Patent Number: 6,001,756
[45] Date of Patent: *Dec. 14, 1999

[54] PROCESS FOR MAKING A SILICON CARBIDE SINTERED BODY

[75] Inventors: Yoshitomo Takahashi, Fujisawa; Hiroaki Wada, Kawasaki; Taro Miyamoto, Yokohama, all of Japan

[73] Assignee: Bridgestone Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/853,719

[22] Filed: May 9, 1997

[30] Foreign Application Priority Data

Feb. 29, 1996 [JP] Japan ........................ 8-43748
Jun. 17, 1996 [JP] Japan ....................... 8-155670

[51] Int. Cl.⁶ .................................................. C04B 35/569
[52] U.S. Cl. ............................ 501/90; 264/604; 264/682
[58] Field of Search ............................. 501/90; 264/604, 264/682

[56] References Cited

U.S. PATENT DOCUMENTS

| | | | |
|---|---|---|---|
| 4,524,138 | 6/1985 | Schwetz et al. | 501/90 |
| 4,564,601 | 1/1986 | Kriegesmann et al. | 501/90 |
| 4,742,029 | 5/1988 | Kurachi et al. | 501/90 |
| 4,925,815 | 5/1990 | Tani et al. | 501/90 |
| 4,980,104 | 12/1990 | Kawasaki | 501/90 |
| 5,093,039 | 3/1992 | Kijima et al. . | |
| 5,094,985 | 3/1992 | Kijima et al. . | |
| 5,182,059 | 1/1993 | Kawasaki et al. | 501/90 |
| 5,470,806 | 11/1995 | Kristic et al. | 501/90 |
| 5,543,368 | 8/1996 | Talbert et al. | 501/90 |
| 5,656,213 | 8/1997 | Sakaguchi et al. | 501/90 |
| 5,863,325 | 1/1999 | Kanemoto et al. | 501/88 |

FOREIGN PATENT DOCUMENTS

| | | |
|---|---|---|
| 60-108370 | 6/1985 | Japan . |
| 2-199064 | 8/1990 | Japan . |
| 7-241856 | 9/1995 | Japan . |
| 2 301 349 | 2/1996 | United Kingdom . |

*Primary Examiner*—Karl Group
*Attorney, Agent, or Firm*—Oliff & Berridge, PLC

[57] ABSTRACT

A silicon carbide sintered body according to the present invention is a silicon carbide sintered body having a density of 2.9 g/cm³ or higher, obtained by means of hot pressing a mixture of silicon carbide powder and a non-metal-based sintering additive such as an organic compound which produces carbon upon heating at a temperature of 2,000° C. to 2,400° C. and under a pressure of 300 to 700 kgf/cm² in a non-oxidizing atmosphere. It is preferable that the silicon carbide powder have an average particle diameter of from 0.01 to 10 μm and that the non-metal sintering additive be a resol type phenol resin. The present invention is to provide a silicon carbide sintered body of high quality which has a high density, a high purity, and a high electrical conductivity and which is useful for semiconductor manufacturing industry.

21 Claims, No Drawings

PROCESS FOR MAKING A SILICON CARBIDE SINTERED BODY

BACKGROUND OF THE INVENTION

1. Field of the Invention

The present invention relates to a silicon carbide sintered body and a process for making the same and, more particularly, to a silicon carbide sintered body having a high density useful for structural parts and components of semiconductor manufacturing equipment, electronic information equipment, vacuum devices, and the like.

2. Description of the Related Art

Silicon carbide is a highly covalent material and has found various applications taking advantage of its properties of, for example, strength at a high-temperature, heat resistance, wear resistance and chemical resistance. Recently, there have been demands in the fields of materials for electrical information equipment and semiconductor manufacturing toward a high heat-resistance, and a highly dense and highly pure silicon carbide sintered body without heat distortion and due to heat deterioration when washed with chemicals such as hydrofluoric acid, as in conventional parts and components made of quartz with increase in wafer processing temperature, wafer diameter, and processing unit.

As mentioned above, the silicon carbide is highly covalent and is thus difficult to sinter. Dense silicon carbide sintered bodies are known to be produced by means of hot pressing, reaction sintering, and atmospheric sintering.

The hot pressing is a method in which silicon carbide is sintered under a high pressure and has been studied with a variety of metal sintering additives after this technique was reported (*J. Am. Ceram. Soc.*, 39(11), 386–389 (1956)) with aluminum added as a metal sintering additive. A highly conductive and electrically insulating sintered body was developed in 1980 that was sintered by the hot pressing by adding BeO("Silicon Carbide Ceramics", pages 327–343 published by Uchida Rokakuho (1988)).

The reaction sintering involves in the following steps of: (1) mixing raw materials (i.e., mixing silicon carbide powder and carbon powder), (2) molding fabricating, (3) reaction sintering, and (4) post-processing, if necessary. This technique involves silicification of the carbon particles which have already been molded in the reaction sintering step (3) above, which provides an advantage of allowing sintered bodies of less variation in dimension without any sintering additives. Accordingly, this technique provides an easier operation to produce a sintered body of a higher purity and has been used for production of parts and components for semiconductors. However, the sintered bodies obtained by means of this technique contains non-reacted metal silicon so that their applications are restricted when parts and jigs are used in the fields where the heat resistance, the chemical resistance and a high strength are required.

The atmospheric sintering process is a technique characterized by using sintering additives for sintering the silicon carbide and was proposed by S. Prochazka in "Ceramics for High Performance Applications" in 1974, on page 239. This technique allows production of a high dense structural member having a high strength at a high temperature. As a result, studies of the silicon carbide have been developed. The sintering additive used is a combination of a metal-based sintering additive comprising a metal such as boron, aluminum and beryllium or a compound thereof and a carbon-based sintering additive such as carbon black and graphite. The metal-based sintering additive has essential effects of, for example, reduction of surface energy at a grain boundary due to local deposit of boron onto the boundary, enhancement of diffusion of carbon-boron substances on the grain boundary, and suppression of surface diffusion thereof, for the boron which is used as the optimum sintering additive. The carbon-based sintering additive is considered to have an effect of removing an oxide layer on the surface of silicon carbide particles. Details, however, have still remained unknown.

Metal contaminants are eluded when the metal-based sintering additive used is exposed to a high temperature or is subjected to washing with chemicals. The resultant sintered bodies are thus not suitable for the application to the areas of the semiconductor manufacturing equipment.

In order to overcome the above mentioned problems, Japanese Patent Application Laid-Open (JP-A) No. 60-108370 proposes a process for making a dense sintered body by hot press process without adding a sintering additive, using a special ultra-fine powder of silicon carbide obtained through heat decomposition of a silane compound. However, there is no clear description on properties of the resultant sintered bodies. In this connection, "Silicon Carbide Ceramics", published by Uchida Rokakuho, in 1988, on page 89, describes that it is essential to add boron as a metal-based sintering additive even by using the powder obtained according to this technique.

As an improved hot pressing, Japanese Patent Application Laid-Open (JP-A) No. 2-199064 proposes a process for making a dense sintered body without any additives by the hot press method, using ultra-fine silicon carbide powder synthesized by means of CVD plasma technique. However, impurities such as iron are contained in an amount of several ppm or more even in the process described in this application. This is not a satisfactory level of impurities. The ultra-fine silicon carbide powder used for this system as the sintering additive has an average particle diameter of 30 nm. Such ultra-fine powder is relatively expensive and should be treated with significant care for preventing oxidation on the surface thereof. In light of the above, the process disclosed in the above application is far from a solution to the problems to date.

It is difficult for the conventional processes to obtain a high dense silicon carbide sintered body, containing less or no impurities, which is suitable for being used for parts and components of semiconductor manufacturing equipment and electronic information equipment. Furthermore, there is no such a sintered body available on the market.

SUMMARY OF THE INVENTION

An object of the present invention is to provide a process for making a silicon carbide sintered body of high quality, without using any special material, which has a high density and a high purity and which is suitable for being used for parts and components of semiconductor manufacturing equipment, and to provide a silicon carbide sintered body of high quality obtained by such process in which the sintered body has a high density, a high purity, a high electrical conductivity, and a high thermal conductivity and is useful in various fields including industries of semiconductor and electronic information equipment.

The present inventors had made extensive studies on the above-described history of development of sintering processes. As a result, it has found that a highly dense and highly pure silicon carbide sintered body can be obtained by means of previously placing a non-metal-based sintering additive represented by carbon in an adequate amount on silicon carbide powder and combining hot pressing under specific conditions. The present invention was thus completed.

More specifically, according to a first aspect of the present invention, a silicon carbide sintered body according to the present invention is characterized by being obtained by sintering a mixture of silicon carbide powder and a non-metal-based sintering additive, wherein the sintered body has a density of 2.9 g/cm$^3$ or higher.

The non-metal-based sintering additive of the present invention is preferably an organic compound that produces carbon upon heating. It is more preferable that the non-metal-based sintering additive be a resol type phenol resin.

In the present invention, it is preferable that the surface of the silicon carbide powder be covered with the non-metal-based sintering additive.

It is preferable that the silicon carbide sintered body of the present invention contains carbon in an amount larger than 30% by weight but not larger than 40% by weight.

According to a second aspect of the present invention, a process for making a silicon carbide sintered body according to the present invention is characterized by comprising a sintering step in which a mixture of silicon carbide powder and a non-metal-based sintering additive is hot-pressed at a temperature of 2,000° C. to 2,400° C. and a pressure of 300 to 700 kgf/cm$^2$ in a non-oxidizing atmosphere to obtain a silicon carbide sintered body having a density of 2.9 g/cm$^3$ or higher.

In the process for making a silicon carbide sintered body according to the present invention, it is preferable that the non-metal-based sintering additive be an organic compound that produces carbon upon heating. It is more preferable that the non-metal-based sintering additive be a resol type phenol resin.

In the process for making a silicon carbide sintered body according to the present invention, the homogenous mixture of the silicon carbide powder and a non-metal-based sintering additive may be placed in a mold and heated at a temperature ranging from 80° C. to 300° C. for 5–60 minutes to obtain a molded body, and thereafter, the resultant molded body is subjected to the above mentioned sintering step.

The process for making a silicon carbide sintered body according to the present invention preferably comprises a step of coating a non-metal-based sintering additive on the surface of the silicon carbide powder by means of mixing the sintering additive as such or in the form of solution in a solvent or of dispersion in a dispersion medium with the silicon carbide powder.

In the process for making a silicon carbide sintered body according to the present invention, it is preferable that an amount of a non-metal-based sintering additive be an amount to produce more carbon than stoichiometric amount which is enough to reduce silicon oxide present on the surface of the silicon carbide powder covered.

It is preferable that the silicon carbide powder used in the process for making a silicon carbide sintered body according to the present invention have an average particle diameter of from 0.01 to 10 μm.

In the process for making a silicon carbide sintered body according to the present invention, it is preferable that the silicon carbide powder be obtained through a production process comprising a solidification step for solidifying a homogenous mixture of (1) a liquid silicon compound, (2) a liquid organic compound that produces carbon upon heating, and (3) a polymerization catalyst or a cross-linking catalyst to obtain a solid product; and a baking step for heating the resultant solid product in a non-oxidizing atmosphere to carbonize the solid product and sintering it in a non-oxidizing atmosphere. It is more preferable that the liquid silicon compound be ethyl silicate.

DESCRIPTION OF THE PREFERRED EMBODIMENT

The present invention is described more in detail below.

Silicon carbide powder used as a raw material for the silicon carbide sintering body according to the present invention may be an α-type, a β-type, an amorphous type, or a mixture thereof. In particular, the β-type silicon carbide powder can advantageously be used. There is no specific limitation on the grade of the β-type silicon carbide powder. For example, a commercially available β-type silicon carbide powder may be used. The particle diameter of the silicon carbide powder is preferably as small as possible from the viewpoint of increasing the density. It is preferable that the particle diameter thereof be from 0.01 to 10 μm, and more preferably from 0.05 to 1 μm. The particle diameter of smaller than 0.01 μm results in difficulties in handling in subsequent steps including weighing and mixing. On the other hand, it is not preferable that the particle diameter is larger than 10 μm so that the specific surface area thereof becomes small, i.e., the contact area with adjacent particles becomes small to make densification difficult.

With respect to this, such silicon carbide powder may suitably be used that has a particle diameter of 0.05 to 1 μm, a specific surface area of 5 m$^2$/g or larger, a free carbon content of 1% or less, and an oxygen content of 1% or less. In addition, the particle size distribution of the silicon carbide powder used is not limited to specific one. Silicon carbide powder having two or more size distribution peaks may be used in view of a high packing density of the powder and a high reactivity of the silicon carbide powder during the manufacturing process of the silicon carbide sintering body.

A silicon carbide powder of high purity may be used as a raw material silicon carbide powder in order to obtain a silicon carbide sintered body of high purity.

The silicon carbide powder of high purity may be obtained through a production process comprising a sintering step for sintering, in a non-oxidizing atmosphere, a solid product obtained from a homogenous mixture of, for example, a silicon source containing at least one liquid silicon compound, a carbon source containing at least one liquid organic compound that produces carbon upon heating, and a polymerization or cross-linking catalyst. The liquid silicon compound may be used together with a solid silicon compound.

The silicon compound used for producing the silicon carbide powder of high purity (hereinafter, conveniently referred to as a silicon source) may be a combination of a liquid one and a solid one. However, at least one silicon compound should be in a liquid form. Examples of a liquid silicon compound include alkoxysilane (mono-, di-, tri-, tetra-) and polymers of tetraalkoxysilane. Among alkoxysilane, tetraalkoxysilane is advantageously used. More specifically, methoxysilane, ethoxysilane, propoxysilane, and butoxysilane may be used adequately. However, it is preferable to use ethoxysilane from the viewpoint of handling. Examples of the polymers of tetraalkoxysilane include low molecular weight polymers (oligomers) having a degree of polymerization of 2 to 15, and liquid polymers of silicic acid having a higher degree of polymerization. Examples of the solid silicon compound which maybe combined with the liquid one include silicon oxide. It is noted that the silicon oxide used herein includes SiO, silica sol (colloidal ultra-fine silica containing solution, which contains an OH or alkoxy group therein) and silicon dioxide (silica gel, fine silica, quartz powder).

Of these silicon sources, it is suitable to use an oligomer of tetraethoxysilane or a mixture of an oligomer of tetraethoxysilane and ultra-fine powder of silica in light of homogeneity and handling. These silicon sources used are highly pure substances and preferably contain impurities in an amount of not larger than 20 ppm, and more preferably 5 ppm, at an initial stage.

The organic compound that produces carbon upon heating, which is used for the production of the highly pure silicon carbide powder, may be in a liquid form or a mixture of liquid and solid forms. It is preferable that the organic compound be the one that has a higher residual carbon ratio and is to be polymerized or cross-linked by means of a catalyst or heat. More specifically, examples of such organic compound include monomers and prepolymers of phenol resins, furan resins, other resins such as polyimide, polyurethane, and polyvinyl alcohol. In addition, liquid compounds of cellulose, sucrose, pitch and tar may be used. In particular, a resol type phenol resins are preferable. The purity thereof may adequately be controlled and selected depending on purposes. However, it is preferable that the organic compound be used which contains metals each in an amount of 5 ppm or less when highly pure silicon carbide powder is desirable.

A ratio of carbon to silicon (hereinafter, referred to as a C/Si ratio) is defined by means of elementary analysis of a carbide intermediate obtained by carbonizing the mixture at 1,000° C. The free carbon in the silicon carbide produced stoichometrically would become 0% when the C/Si ratio is 3.0. However, the free carbon is actually generated at a lower C/Si ratio due to vaporization of SiO gas generated simultaneously. It is important to determine the blending ratio previously such that the amount of the free carbon in the silicon carbide powder produced does not become inadequate for the sintered body production purpose. Generation of the free carbon can be inhibited typically at the C/Si ratio of 2.0 to 2.5 for the baking at around 1 atm and 1,600° C. or higher. This range may be used advantageously. The C/Si ratio of 2.5 or higher increases remarkably the free carbon, which has an effect of inhibiting growth of the particles. With this respect, the C/Si ratio may be selected adequately depending on purposes of particle formation. It is, however, noted that the C/Si ratio for obtaining the pure silicon carbide will vary when the baking is made at a high or low atmospheric pressure. In such a case, it is not limited to the above mentioned range of the C/Si ratio. Since free carbon has a very weak effect on sintering as compared with that of carbon originated from a non-metal-based sintering additive which covers silicon carbide powder used in the present invention, the free carbon may be negligible.

In the present invention, a mixture of the silicon source and the organic compound may be solidified to form a solid product, if necessary, to obtain a solid product of a homogenous mixture of the silicon source and the organic compound that produces carbon upon heating. The solidification may be made by means of cross-linking upon heating, curing with a curing catalyst, and by an electron beam or a radiation. The curing catalyst may be selected adequately depending on the carbon source used. When the carbon source is a phenol or furan resin, the curing agent may be acids such as toluene sulfonic acid, toluene carboxylic acid, acetic acid, oxalic acid, hydrochloric acid, and sulfuric acid, or amine such as hexamine.

The solid product of the raw material mixture may be carbonized by heating, if necessary. This is achieved by means of heating the solid product in a non-oxidizing atmosphere of nitrogen or argon at a temperature of 800° C. to 1,000° C. for 30 to 120 minutes.

The silicon carbide is generated when the resultant carbonized compound is heated in the non-oxidizing atmosphere of argon or the like at a temperature between 1,350° C. and 2,000° C., both inclusive. The time and temperature of baking may be selected adequately depending on the desired properties including a particle diameter or the like. For more effective production, however, it is preferable that the baking be made a temperature between 1,600° C. and 1,900° C.

If powder of higher purity is required, the impurities are further removed by means of heat treatment at a temperature from 2,000° C. to 2,100° C. for 5–20 minutes during the above mentioned baking.

As a process for producing silicon carbide powder of particularly high purity, a process for producing a monocrystal described in Japanese Patent Application No. 7-241856 filed by the present applicant may be used for producing raw material powder. More specifically, this is a process for making silicon carbide powder of high purity characterized by comprising a silicon carbide production step for producing silicon carbide powder by means of heating and baking in a non-oxidizing atmosphere a homogenous mixture of a silicon source comprising one or more selected from tetraalkoxysilane and polymers of tetraalkoxysilane of high purity and a carbon source comprising an organic compound of high purity that produces carbon upon heating; and a post-treatment step in which the resultant silicon carbide powder is kept at a temperature from equal to or higher than 1,700° C. to lower than 2,000° C. and is heated, at least once, to a temperature between 2,000° C. and 2,100° C. for 5 to 20 minutes while the temperature between 1,700° C. and 2,000° C. is kept, to obtain silicon carbide powder having a content of each impurity of 0.5 ppm or less through the above two steps.

The non-metal-based sintering additives used in making the silicon carbide sintered body of the present invention to be mixed with the above mentioned silicon carbide powder may be a substance called the carbon source that produce carbon upon heating. Examples of the carbon sources used include organic compounds that produce carbon upon heating and the silicon carbide powder (particle diameter: 0.01–1 μm) covered with these compound. The organic compounds are more preferable in view of effects.

Specific examples of the organic compounds that produce carbon upon heating include coal tar pitch, pitch tar, phenol resins, furan resins, epoxy resins, phenoxy resins, and various saccharides including monosaccharides such as glucose, oligosaccharides such as sucrose, and polysaccharides such as cellulose and starch, having a high residual carbon ratio. Suitably used are those in the liquid form at an ordinary temperature, those to be dissolved into solvents, those to be softened or liquefied upon heating such as thermoplastic or thermomelting materials. Of these, the phenol resins, particularly resol type phenol resins are desirable with which a molded product of a high strength can be obtained. The above-described organic compounds generate inorganic carbon compounds such as carbon black and graphite when the organic compounds are heated in the system. The inorganic compounds generated are considered to be effective as sintering additives. When inorganic carbon compounds such as carbon black and graphite as sintering additives are added directly to the sintering system, the effect of the present invention cannot be achieved.

In the present invention, it is preferable that when the mixture of the silicon carbide powder and a non-metal-based sintering additive are prepared, the non-metal-based sintering additive is dissolved or dispersed in a solvent. The solvent may be the one that is suitable for the compound used as the non-metal-based sintering additives. More specifically, the solvent may be a lower alcohol such as ethyl alcohol, ethyl ether, or acetone for the phenol resin that is a suitable organic compound which produces carbon upon heating. It is preferable that the non-metal-based sintering additive and the solvent used have amounts of impurities as low as possible.

Typically, the amount of the non-metal-based sintering additive to be mixed with the silicon carbide powder is preferably adjusted to an amount of 10% or less, preferably 2–5% by weight as carbon, though depending on the type of the non-metal-based sintering additive used, because an excessively small amount of the non-metal-based sintering additive prevents the sintered body from being densified while an excessively large amount increases the amount of free carbon contained in the sintered body, which tends to inhibit densification. The amount may be determined in advance by quantifying the amount of silica (silicon oxide) on the surface of the silicon carbide powder with hydrofluoric acid and calculating a stoichiometric amount sufficient to reduce it.

Here, the amount of addition as carbon as described above in the amount determined in light of a residual carbon ratio (ratio of production of carbon in a non-metal-based sintering additive) after the thermal decomposition of the non-metal-based based sintering additive, where the silica ($SiO_2$) is reduced by the carbon originated from the non-metal-based sintering additive according to the following equation:

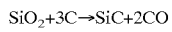

$$SiO_2 + 3C \rightarrow SiC + 2CO$$

The silicon carbide sintered body of the present invention preferably contains carbon atoms originated from silicon carbide contained in the silicon carbide sintered body and originated from the non-metal-based sintering additive, in an amount of more than 30% by weight and less than 40% by weight. When the sintered body does not contain any impurities, the content of carbon atoms is theoretically 30% by weight. That is, if impurities are contained in the sintered body in a high amount, the content of carbon atoms in the sintered body becomes less than 30% by weight. This is not preferable. It is also not preferable that the amount of carbon atoms is more than 40% by weight, since the density of the sintered body obtained becomes lower and various properties such as the strength of and the resistance to oxidation of the sintered body are deteriorated.

When the silicon carbide sintered body of the present invention is prepared, the silicon carbide powder and the non-metal-based sintering additive are mixed homogeneously first. As mentioned above, the phenol resin which is a preferable non-metal-based sintering additive is dissolved in a solvent such as ethyl alcohol to mix it well with the silicon carbide powder. The mixing may be carried out by use of known mixing means such as a mixer, a planetary ball mill or the like. It is preferable that the mixing be carried out for 10–30 hours, particularly 16–24 hours. After throughout mixing, the solvent is removed at a temperature compatible with physical properties of the solvent used, e.g., at a temperature of 50–60° C. for ethyl alcohol described above. The mixture evaporated to dryness and the resultant material is sieved to obtain raw material powder of the mixture. It is necessary, from the viewpoint of purification to a higher degree, that a ball mill and balls are made of a synthetic resin containing little or no metal. For drying, a granulator such as a spray dryer may be used.

The sintering step which is an essential step in the production process for producing a sintered body of the present invention is a step in which the powdery mixture or a molded body of the powdery mixture obtained in a molding step described below is placed in a mold in a non-oxidizing atmosphere at a temperature of 2,000–2,400° C. and a pressure of 300–700 kgf/cm$^2$ for hot pressing.

It is preferable that a material made of graphite be used at apart of or whole mold or that a sheet of Teflon be intervened between the molded product and metal portions of the mold in the mold so as to prevent direct contact therebetween from the viewpoint of the purity of the resultant sintered body.

In the present invention, the hot pressing may be carried out at a pressure of 300 to 700 kgf/cm$^2$. In particular, it is necessary to select components for the hot pressing used herein such as a die and a punch having a good pressure resistance when a pressure of 400 kgf/cm$^2$ or more is applied.

Now, the sintering step is described in detail. It is preferable that the impurities be removed well and the carbon of the non-metal-based sintering additive be carbonized completely by heating and increasing temperature under the following conditions before the hot press step for producing the sintered body by the hot press treatment.

More specifically, it is preferable that a temperature increase step with the following two stages be carried out. First, the inside of a furnace is heated gradually from room temperature to 700° C. in vacuum. The temperature may be increased continuously up to 700° C. when it is difficult to control the temperature in the furnace. Preferably, the inside of the furnace is adjusted at 10$^{-4}$ torr and the temperature is increased gradually from room temperature to 200° C., at which the temperature of the furnace is kept for a predetermined time. The temperature is further increased gradually to 700° C. The furnace is kept for a certain time at a temperature around 700° C. In this first stage of the rise of temperature, adsorbed water and organic solvents are eliminated and carbonization proceeds as a result of thermal decomposition of the non-metal-based sintering additives. The time during which the temperature is kept around 200° C. or around 700° C. is selected to be an adequate range in accordance with the size of the sintered body. The time when decrease of degree of vacuum becomes slight to some extent may be a rough measure to determine whether the holding time is enough. If the sintered body is abruptly heated at this timing, the removal of the impurities and carbonization of the carbon of the non-metal-based sintering additive are not performed enough. This may cause cracking and voids in the sintered body.

As an example, a sample of 5–10 g is heated gradually at 10$^{-4}$ torr from room temperature to 200° C. and is kept at that temperature for about 30 minutes. Subsequently, the sample is heated gradually to 700° C. The time taken to heat the sample from room temperature to 700° C. is from 6 to 10 hours, preferably about 8 hours. It is preferable that the sample be held at a temperature around 700° C. for 2–5 hours.

In vacuum, the sample is heated from 700° C. to 1,500° C. over 6–9 hour periods under the above mentioned conditions and is held at 1,500° C. for 1–5 hours. It is assumed that the silicon dioxide and silicon oxide are reduced during this process. It is important to complete this reduction in order to remove oxygen bonded to silicon. It is thus necessary that the sample is kept at 1,500° C. until generation of carbon monoxide is finished that is a by-product of this reducing reaction, i.e., until decrease of the degree of vacuum becomes slight and the degree of vacuum is recovered to that achieved at around 1,300° C., which is the temperature before the beginning of the reducing reaction. The reduction in this second stage of the rise of temperature contributes to the removal of silicon dioxide that adheres to the surface of the silicon carbide powder to inhibit densification and cause growth of larger particles. Gases which are generated in this reduction process contain SiO and CO, and are accompanied by elements of impurities. The gases generated are continuously exhausted into a reactor by the use of a vacuum pump and are removed from the silicon carbide. Accordingly, it is preferable that the temperature be kept well from the viewpoint of achieving a higher purity.

It is preferable that the hot press be carried out at a high temperature after completion of the temperature increasing stages. The sintering starts when the temperature reaches at a temperature higher than 1,500° C. In this event, application of the pressure is started and the pressure is increased to approximately 300–700 kgf/cm$^2$ in order to inhibit abnormal growth of the particles. Thereafter, an inert gas is introduced into the furnace to provide a non-oxidizing atmosphere in the furnace. The inert gas used may be nitrogen or argon. It is, however, preferable that argon be used because it is not reactive at a high temperature.

After the inside of the furnace is brought to a non-oxidizing atmosphere, heat and pressure are applied to achieve a temperature of 2,000° C. to 2,400° C., and a pressure of 300 to 700 kgf/cm$^2$. The pressure upon pressing may be selected depending on the particle diameter of the raw material powder. With a smaller particle diameter of the raw material powder, it is possible to obtain a favorable sintered body at a relatively low pressure to be applied. The rise of temperature from 1,500° C. to a highest temperature of 2,000–2,400° C. is carried out over 2–4 hours, during which the sintering proceeds rapidly at around 1,850–1,900° C. The temperature is kept for 1–3 hours at this highest temperature to complete the sintering.

In this event, the densification is not sufficient when the highest temperature is lower than 2,000° C. On the other hand, the highest temperature of higher than 2,400° C. is not preferable because the powder or the raw material of the sintered body tends to sublimate or be decomposed. The densification is not sufficient when the pressure is lower than 300 kgf/cm$^2$. On the other hand, the pressure of higher than 700 kgf/cm$^2$ is not preferable from the viewpoint of efficiency of production because such a high pressure may cause damage of a mold made of, for example, graphite.

In this sintering step, it is preferable from the viewpoint of keeping purity of the resultant sintered body that a graphite material of high purity be used for the graphite mold and insulating materials of a heating furnace. The graphite material used is the one subjected to purification treatment. More specifically, it is preferable to use the graphite material that is previously baked well at a temperature equal to or higher than 2,500° C. and that produces less or no impurities at a sintering temperature. In addition, it is also preferable to use the inert gas which is highly purified one containing less or no impurities.

In the present invention, the above-mentioned sintering step provides a silicon carbide sintered body having superior properties. A following molding step may be carried out prior to the sintering step in light of the densification of the final sintered body. The molding step that may be carried out prior to the sintering step is described below. In this event, the molding step is a step in which a raw material powder obtained by homogeneously mixing the silicon carbide powder and a non-metal-based sintering additive is placed in a mold and is heated under pressure at a temperature ranging from 80 to 300° C. for 5 to 60 minutes to prepare a molded body. It is preferable that the raw material powder be filled in the mold as dense as possible from the viewpoint of the densification of the final sintered body. This molding step allows to make bulky powder compact previously in filling the sample for the hot pressing. Accordingly, this facilitates production of a thick sintered body by repeating this molding step.

At a heating temperature ranging from 80 to 300° C., preferably from 120 to 140° C. depending on properties of the non-metal-based sintering additive used, and under a pressure ranging from 60 to 100 kgf/cm$^2$, the raw material powder filled is pressed to provide a density of 1.5 g/cm$^3$ or higher, preferably 1.9 g/cm$^3$ or higher, and is kept under pressure for 5 to 60 minutes, preferably 20 to 40 minutes to produce a molded body made of the raw material powder. The smaller the average particle diameter is, the more it becomes difficult to increase the density of the molded body. For achieving a higher density of the molded body, it is preferable to use vibration packing for placing the powder in the mold. More specifically, the density is preferably 1.8 g/cm$^3$ or higher for the powder having the average particle diameter of about 1 $\mu$m, and 1.5 g/cm$^3$ for the powder having the average particle diameter of about 0.5 $\mu$m. The density of lower than 1.8 g/cm$^3$ and 1.5 g/cm$^3$ for the particle diameters of 1 $\mu$m and 0.5 $\mu$m, respectively, makes it difficult to increase the density of the final sintered body.

The molded body may be cut so as to fit in a hot press mold before it is subjected to the subsequent sintering step. The molded body is placed in the mold in a non-oxidizing atmosphere at a temperature of 2,000 to 2,400° C. and a pressure of 300 to 700 kgf/cm$^2$. The molded body is thus subjected to the sintering step where it is hot pressed to obtain a highly pure and highly dense silicon carbide sintered body.

The silicon carbide sintered body produced in the manner described above is sufficiently dense with a density of 2.9 g/cm$^3$ or higher. The density of the resultant sintered body of lower than 2.9 g/cm$^3$ deteriorates mechanical properties such as bending strength and fracture strength as well as electrical properties, enlarges the particles, and aggravates contamination. It is more preferable that the silicon carbide sintered body have a density of 3.0 g/cm$^3$ or higher.

When the resultant sintered body is porous, such problems arise that heat resistance, oxidation resistance, chemical resistance and mechanical strength thereof are low, and that the sintered body is difficult to be washed, that fine cracks in the sintered body are caused to form small pieces thereof being contaminants, and that the sintered body has a gas permeability. Consequently, these problems result in limited applications of the sintered body.

The silicon carbide sintered body obtained in the present invention has a content in total of impurities of 5 ppm or less, preferably 3 ppm or less, and more preferably 1 ppm or less. The impurity contents obtained by means of chemical analyses only have a meaning of reference values from the viewpoint of applying it to the semiconductor industrial field. In practice, assessment varies depending on whether the impurities are distributed uniformly or localized.

Accordingly, those skilled in the art typically assess through various means to what extent the impurities contaminate wafers under predetermined heating conditions by using a practical device. According to a production process comprising a carbonizing step by heating, in a non-oxidizing atmosphere, a solid product obtained by mixing homogeneously a liquid silicon compound, a non-metal-based sintering additive, and a polymerization or cross-linking catalyst, and the subsequent baking step thereof in the non-oxidizing atmosphere, it is possible to make the contents in total of the impurities other than silicon, carbon, and oxygen in the silicon carbide sintered body be 1 ppm or less.

By studying favorable properties of the silicon carbide sintered body obtained in the present invention, it is preferable that the sintered body have a bending strength at room temperature of 500 to 650 kgf/mm$^2$, a bending strength at 1,500° C. of 550 to 800 kgf/mm$^2$, a Young's modulus of $3.5 \times 10^4$ to $4.5 \times 10^4$, a Vickers hardness of 2,000 kgf/mm$^2$ or higher, a Poisson's ratio of 0.14 to 0.21, a coefficient of thermal expansion of $3.8 \times 10^{-6}$ to $4.2 \times 10^{-6}$ (° C.$^{-1}$), a thermal conductivity of 150 W/m•k or higher, a specific heat of 0.15 to 0.18 cal/g•° C., a thermal shock resistance of 500 to 700 ΔT° C., and a resistivity of 0.01 Ω•cm or higher.

The sintered body obtained by means of the production process described above may be subjected to treatments such as machining, polishing, and washing in accordance with its objects for use. The sintered body of the present invention may be produced by forming a cylindrical sample (sintered body) by hot press and by slicing it in the radial direction. For this machining, electrical discharge machining is suitably used. Then, the machined sintered body is used for parts and components for manufacturing semiconductors and electronic information equipment.

Representative examples of the semiconductor manufacturing device where the parts and components made of the sintered body of the present invention are used include an exposure equipment, resist processing equipment, dry etching equipment, cleaning equipment, heat treatment equipment, ion implanter, CVD equipment, PVD equipment, and dicing equipment. Examples of the parts and components include plasma electrodes for the dry etching equipment, protection ring (focus rings), slit component (aperture) for the ion implanter, protection plate for an ion generation unit and mass spectrometer, and a dummy wafer used in wafer treatment in the heat treatment equipment or the CVD equipment and a heater used in the heat treatment equipment, CVD equipment or PVD equipment, more specifically, a heater for heating a wafer directly at the bottom thereof.

Examples of the parts and components for the electronic information equipment include a disk base for a hard disk device and thin film magnetic head base. In addition, sputtering targets for use in forming a thin film on surfaces of magneto-optical disks and other sliding surfaces are also included in these parts and components.

The parts made of the sintered body of the present invention may be used for a reflection mirror for synchrotron radiation beam or laser beam.

In the production process of the present invention, there is no specific limitation to production apparatuses as long as the above-mentioned heating conditions of the present invention are satisfied. In light of the pressure resistance of the mold used for the sintering, known reactors and heating furnaces may be used.

It is preferable that the purity of the silicon carbide powder which is a raw material powder, of the silicon and carbon sources for use in producing the raw material powder, and the inert gas used for providing the non-oxidizing atmosphere be 1 ppm or less in contents of each impurity element. However, it is not necessary to limit to the above range as long as it is in an allowable range of purification in the heating and sintering steps The term "impurity element" used herein means group 1 to group 16 elements in the periodic table of revised version of IUPAC inorganic chemistry nomenclature in 1989 that have an atomic number of not smaller than 3 except for those having an atomic number of 6 to 8 and 14 to 16.

EXAMPLES

Though the present invention is described specifically in conjunction with a set of examples, it is understood that the present invention is not limited to those examples as long as it does not outside the scope of the present invention.

Example 1

Production of Molded Body 90 g of a silicon carbide powder of high purity (average particle diameter of 1.1 μm: silicon carbide powder containing silica of 1.5% by weight and having an impurity content of 5 ppm or less obtained in accordance with a production process filed as the above mentioned Japanese Patent Application No. 7-241856) and a solution of 10 g of liquid resol type phenol resin (residual carbon ratio after thermal decomposition: 50%) of high purity having a water content of 20% dissolved in 150 g of ethanol were agitated for 18 hours in a planetary ball mill and mixed with each other sufficiently. Then, the mixture was heated to 50–60° C. to evaporate ethanol to dryness and was screened through a sieve of 500 μm to obtain homogenous raw material powder of silicon carbide. 8.5 g of this raw material powder was filled in a mold of 30 mmφ and was pressed at 130° C. for 20 minutes to obtain a molded body having a density of 2.1 g/cm$^3$.

Production of Sintered Body

This molded body was placed in a graphite mold and was subjected to hot pressing under the following conditions. A hot press machine used was a high frequency induction heating 10-t hot press.

(Conditions for Sintering Step)

The temperature was increased from room temperature to 700° C. under a vacuum condition of between $10^{-5}$ and $10^{-4}$ torr over a 6-hour period and it was kept at that temperature for 5 hours (first stage of temperature increase).

The temperature was increased from 700° C. to 1,200° C. under vacuum over a 3-hour period and was further increased from 1,200° C. to 1,500° C. for additional 3 hours. It was then kept at that temperature for 1 hour (second stage of temperature increase).

Thereafter, it was pressed at a pressure of 500 kgf/cm$^2$ and the temperature was increased from 1,500° C. to 2,200° C. in an argon atmosphere over a 3-hour period. It was then kept at that temperature for 1 hour (hot press step).

The resultant sintered body had a density of 3.15 g/cm$^3$, a Vickers hardness of 2,300 kgf/mm$^2$, and an electrical resistivity of 0.02 Ω•cm. These properties are shown in Table 1 below. In addition, concentrations of the impurities are given in Table 2 below.

Physical properties of the sintered body obtained in Example 1 were measured precisely. As a result, it was found that the sintered body had, other than the above mentioned properties, a bending strength of 570 kgf/mm$^2$ at room temperature, a bending strength of 600 kgf/mm$^2$ at 1,500° C., a Young's modulus of $4.1 \times 10^4$, a Poisson's ratio of 0.15, a coefficient of thermal expansion of $3.9 \times 10^{-6}$° C.$^{-1}$, a thermal conductivity of 200 W/m•k or higher, a specific heat of 0.16 cal/g·° C., and a thermal shock resistance of 530 ΔT° C., all of which fell within the above mentioned preferable ranges.

Example 2

Production of Molded Body

A molded body having a density of 1.85 g/cm³ was obtained in a similar manner to that in Example 1.

Production of Sintered Body

This molded body was placed in a graphite mold and was subjected to hot pressing under the following conditions. A hot press machine used was the same as the one used in Example 1.

(Conditions for Hot Pressing)

The temperature was increased from room temperature to 700° C. under a vacuum condition of between 10⁻⁵ and 10⁻⁴ torr over a 6-hour period and it was kept at that temperature for 1 hour (first stage of temperature increase).

The temperature was increased from 700° C. to 1,200° C. under vacuum over a 3-hour period and was further increased from 1,200° C. to 1,500° C. over an additional 3-hour period. It was then kept at that temperature for 1 hour (second stage of temperature increase).

Thereafter, it was pressed at a pressure of 500 kgf/cm² and the temperature was increased from 1,500° C. to 2,100° C. in an argon atmosphere over a 3-hour period. It was then kept at that temperature for 1 hour (hot press step).

The resultant sintered body had a density of 3.09 g/cm³, a Vickers hardness of 2,200 kgf/mm², and an electrical resistivity of 1.0 Ω·cm. These properties are shown in Table 1 below. In addition, concentrations of the impurities are given in Table 2 below.

Example 3

Production of Molded Body

A molded body having a density of 1.5 g/cm³ was obtained in a similar manner to that in Example 1.

Production of Sintered Body

This molded body was placed in a graphite mold and was subjected to hot pressing under the following conditions. A hot press machine used was the same as the one used in Example 1.

(Conditions for Hot Pressing)

The temperature was increased from room temperature to 700° C. under a vacuum condition of between 10⁻⁵ and 10⁻⁴ torr over an 8-hour period and thereafter, it was kept at that temperature for 1 hour (first stage of temperature increase).

The temperature was increased from 700° C. to 1,200° C. under vacuum over a 3-hour period and was further increased from 1,200° C. to 1,500° C. over an additional 3-hour period. It was then kept at that temperature for 4 hours (second stage of temperature increase).

Thereafter, it was pressed at a pressure of 500 kgf/cm² and the temperature was increased from 1,500° C. to 2,200° C. in an argon atmosphere over a 4-hour period. It was then kept at that temperature for 1 hour (hot press step).

The resultant sintered body had a density of 3.18 g/cm³, a Vickers hardness of 2,300 kgf/mm², and an electrical resistivity of 0.03 Ω·cm. These properties are shown in Table 1 below. In addition, concentrations of the impurities are given in Table 2 below.

Example 4

Production of Molded Body 90 g of commercially available β-type silicon carbide powder (produced by H. C. Schtark Co., average particle diameter of 2 μm; containing silica of 3.0% by weight) and a solution of 10 g of liquid resol type phenol resin of high purity having a water content of 20% dissolved in 150 g of ethanol were agitated for 18 hours in a planetary ball mill and mixed with each other sufficiently. Then, the mixture was heated to 50–60° C. to evaporate ethanol to dryness and was screened through a sieve of 500 μm to obtain homogenous raw material powder of silicon carbide. 8.5 g of this raw material powder was filled in a mold of 30 mmφ and was pressed at 130° C. for 20 minutes to obtain a molded body having a density of 2.2 g/cm³.

Production of Sintered Body

This molded body was placed in a graphite mold and was subjected to hot pressing under the following conditions. A hot press machine used was a high frequency induction heating 10-t hot press.

(Conditions for Sintering Step)

The temperature was increased from room temperature to 700° C. under a vacuum condition of between 10⁻⁵ and 10⁻⁴ torr over a 6-hour period and it was kept at that temperature for 5 hours (first stage of temperature increase).

The temperature was increased from 700° C. to 1,200° C. under vacuum over a 3-hour period and was further increased from 1,200° C. to 1,500° C. over an additional 3-hour period. It was then kept at that temperature for 1 hour (second stage of temperature increase).

Thereafter, it was pressed at a pressure of 500 kgf/cm² and the temperature was increased from 1,500° C. to 2,200° C. in an argon atmosphere over a 3-hour period. It was then kept at that temperature for 1 hour (hot press step).

The resultant sintered body had a density of 3.18 g/cm³, a Vickers hardness of 2,300 kgf/mm², and an electrical resistivity of 0.02 Ω·cm. These properties are shown in Table 1 below.

Example 5

8.5 g of raw material powder of silicon carbide obtained in the same manner as described in Example 1 was filled in the mold used in Example 1 and was pressed. Then, the powder was filled directly in a graphite mold without the molding step and was hot pressed under similar conditions as in Example 1. The hot press machine used was the same as the one used in Example 1.

(Conditions for Hot Pressing)

The temperature was increased from room temperature to 700° C. under a vacuum condition of between 10⁻⁵ and 10⁻⁴ torr over an 8-hour period and it was kept at that temperature for 1 hour (first stage of temperature increase).

The temperature was increased from 700° C. to 1,200° C. under vacuum over a 3-hour period and was further increased from 1,200° C. to 1,500° C. for additional 3 hours. It was then kept at that temperature for 4 hours (second stage of temperature increase).

Thereafter, it was pressed at a pressure of 500 kgf/cm² and the temperature was increased from 1,500° C. to 2,200° C. in an argon atmosphere over a 4-hour period. It was then kept at that temperature for 1 hour (hot press step).

The resultant sintered body had a density of 3.05 g/cm³, a Vickers hardness of 2,500 kgf/mm², and an electrical resistivity of 0.03 Ω·cm. These properties are shown in Table 1 below.

Comparative Example 1

Production of Molded Body

A molded body having a density of 2.0 g/cm³ was prepared in a similar manner to that in Example 1.

Production of Sintered Body

This molded body was placed in a graphite mold and was subjected to hot pressing under the following conditions. A hot press machine used was the same as the one used in Example 1.

(Conditions for Hot Pressing)

The temperature was increased from a room temperature to 700° C. under a vacuum condition of between $10^{-5}$ and $10^{-4}$ torr over a 6-hour period and it was kept at that temperature for 1 hour (first stage of temperature increase).

The temperature was increased from 700° C. to 1,200° C. under vacuum over a 3-hour period and was further increased from 1,200° C. to 1,500° C. over an additional 1.5-hour period. It was then kept at that temperature for 1 hour (second stage of temperature increase).

Thereafter, it was pressed at a pressure of 150 kgf/cm² and the temperature was increased from 1,500° C. to 2,200° C. in an argon atmosphere over a 3-hour period. It was then kept at that temperature for 1 hour (hot press step).

The resultant sintered body had a density of 2.45 g/cm³, a Vickers hardness of 1,900 kgf/mm², and an electrical resistivity of $1\times10^3$ Ω•cm. A number of voids were found in the sintered body. These properties are shown in Table 1 below.

Example 6

Pitch tar was dissolved in ethanol and added in an amount of 25% by weight to silicon carbide as the organic compound that produces carbon upon heating to apply this organic compound to the surface of the silicon carbide powder. Then, raw material powder of silicon carbide obtained in a similar manner as in Example 5 was sintered under the same conditions as in Example 5.

The resultant sintered body had a density of 3.05 g/cm³, a Vickers hardness of 2,200 kgf/mm², and an electrical resistivity of 0.1 Ω•cm. These properties are shown in Table 1 below.

As a result, raw material powder of silicon carbide was obtained which had a particle diameter of 1.5 µm and contained 1.0% by weight of free carbon. The raw material powder was sintered under the same conditions as in Example 5 without adding any sintering additives. The resultant sintered body had a density of only 2.7 g/cm³, indicating that a sintered body having a sufficient density could not be obtained.

Comparative Example 4

Boron carbide ($B_4C$) was added in an amount of 1% by weight to silicon carbide powder as a metal-based sintering additive and was dispersed well along with the silicon carbide powder by using ethanol. The mixture was mixed sufficiently and was then dried to obtain powder to be sintered. The powder was hot pressed under the same conditions as in Example 5 without the molding step.

The resultant sintered body was dense with a density of 3.15 g/cm³ and a Vickers hardness of 2,400 kgf/mm². However, the sintered body had an electrical resistivity of $10^5$ Ω•cm and was not electrically conductive. This sintered body was immersed in a mixture of hydrofluoric acid and nitric acid (1:1) and was heated under pressure in a sealed container. 2 hours later, the purity of the liquid in the container was analyzed. As a result, boron of more than 1,000 ppm was detected.

TABLE 1

Physical Properties of Sintered Bodies

| | Example 1 | Example 2 | Example 3 | Example 4 | Example 5 | Example 6 | Comparative Example 1 | Comparative Example 2 | Comparative Example 3 | Comparative Example 4 |
|---|---|---|---|---|---|---|---|---|---|---|
| Density (g/cm³) | 3.15 | 3.09 | 3.18 | 3.18 | 3.05 | 3.05 | 2.45 | 2.6 | 2.7 | 3.15 |
| Electrical resistivity (Ω · cm) | 0.02 | 1.0 | 0.03 | 0.02 | 0.03 | 0.1 | 1,000 | $10^4$ | $10^4$ | $10^5$ |
| Hardness (kgf/mm²) | 2,300 | 2,200 | 2,300 | 2,300 | 2,500 | 2,200 | 1,900 | 1,900 | 1,900 | 2,400 |
| Thermal Conductivity (W/m · k) | 200 | 180 | 192 | 140 | 195 | 130 | 50 | 70 | 80 | 80 |

Comparative Example 2

Carbon black was added in an amount of 2% by weight to silicon carbide powder as an inorganic carbon-based sintering additive and was dispersed well along with the silicon carbide powder by using ethanol. The mixture was mixed sufficiently and was then dried to obtain powder to be sintered. The powder was hot pressed under the same conditions as in Example 5 without the molding step. The resultant sintered body had a density of only 2.6 g/cm³, indicating that a sintered body having a sufficient density could not be obtained.

Comparative Example 3

62.1 g of tetraethyl silicate, 30 g of liquid resol type phenol resin of high purity having a water content of 20%, and 5 g of a 50% aqueous solution of toluene sulfonic acid were used as a silicon source, a carbon source, and a curing catalyst, respectively, and were blended so as to be the C/Si ratio of 2.6. The mixture was then solidified, dried, carbonized, and baked at 1,900° C. in an argon atmosphere.

TABLE 2

Impurity Concentration in Sintered Bodies (unit: ppm)

| | Example 1 | Example 2 | Example 3 | Comparative Example 1 |
|---|---|---|---|---|
| B | 0.00 | 0.00 | 0.00 | 0.00 |
| Al | 0.02 | 0.02 | 0.02 | 0.02 |
| Na | 0.03 | 0.02 | 0.03 | 0.01 |
| K | 0.00 | 0.00 | 0.00 | 0.00 |
| Mg | 0.05 | 0.03 | 0.02 | 0.05 |
| Ti | 0.02 | 0.01 | 0.01 | 0.01 |
| Cr | 0.00 | 0.00 | 0.00 | 0.00 |
| Fe | 0.03 | 0.03 | 0.05 | 0.05 |
| Ni | 0.01 | 0.01 | 0.01 | 0.01 |
| Co | 0.03 | 0.02 | 0.03 | 0.02 |
| W | 0.00 | 0.00 | 0.00 | 0.00 |
| Cu | 0.00 | 0.01 | 0.00 | 0.01 |

As apparent from Examples and Comparative Examples in Table 1 above, the silicon carbide sintered bodies obtained in Examples 1 through 6 according to the process of the present invention are found to be sintered bodies of high density each having a sufficient density which can be used advantageously for various applications.

As apparent from Table 2, the sintered bodies of Examples 1 through 3 made of the silicon carbide powder used as a raw material that is obtained by purification treatment have a significantly low content of impurities and good properties suitable for parts and components of semiconductor manufacturing equipment and electronic information equipment, in light of the physical properties thereof.

On the other hand, the sintered body in Comparative Example 1 where the hot press was carried out at a low pressure and the sintered body in Comparative Example 3 where no sintering additive was added had low densities and were found to have a number of voids. The sintered body in Comparative Example 4 where a metal-based sintering additive was used had a high electrical resistivity. These sintered bodies were apparently not suitable for parts and components of semiconductor manufacturing equipment and electronic information equipment.

According to the present invention, it is possible to obtain a silicon carbide sintered body of high quality which has a high density, a high purity, a high electrical conductivity, and a high thermal conductivity, which cannot be obtained through conventional processes. Accordingly, the silicon carbide sintered body of the present invention are useful materials in various fields including semiconductor industry, electronic information equipment industry, and the like.

What is claimed is:

1. A process for making a silicon carbide sintered body, comprising:

providing a silicon carbide powder consisting essentially of silicon carbide particles that have an average particle diameter of 0.01 to 10 μm and are formed by the same powder making process; and a sintering step in which a mixture of the silicon carbide powder and a sintering additive that consists essentially of a non-metal-based sintering additive is hot-pressed at a temperature of 2,000° C. to 2,400° C. and under a pressure of 300 to 700 kgf/cm$^2$ in a non-oxidizing atmosphere to obtain a silicon carbide sintered body having a density of 2.9 g/cm$^3$ or higher.

2. A process for making a silicon carbide sintered body as claimed in claim 1, further comprising a molding step in which a homogenous mixture of the silicon carbide powder and the non-metal-based sintering additive is placed in a mold and heated in the mold at a temperature ranging from 80° C. to 300° C. for 5–60 minutes to obtain a molded body, and thereafter, the resultant molded body is subjected to the sintering step.

3. A process for making a silicon carbide sintered body as claimed in claim 1, wherein the non-metal-based sintering additive is an organic compound which produces carbon upon heating.

4. A process for making a silicon carbide sintered body as claimed in claim 3, further comprising a step of coating an organic compound that produces carbon upon heating on the surface of the silicon carbide powder by mixing the non-metal-based sintering additive by itself, in the form of a solution in a solvent, or in the form of a dispersion in a dispersion medium, with the silicon carbide powder.

5. A process for making a silicon carbide sintered body as claimed in claim 3, wherein the mixture comprises an effective amount of the non-metal-based sintering additive to produce more carbon than a stoichiometric amount which is sufficient to reduce silicon oxide present on the surface of the silicon carbide powder covered.

6. A process for making a silicon carbide sintered body as claimed in claim 3, wherein the organic compound which produces carbon upon heating is a resol type phenol resin.

7. A process for making a silicon carbide sintered body as claimed in claim 5, wherein the organic compound which produces carbon upon heating is a resol type phenol resin.

8. A process for making a silicon carbide sintered body as claimed in claim 1, wherein the non-metal-based sintering additive comprises silicon carbide powder covered with an organic compound that produces carbon upon heating.

9. A process for making a silicon carbide sintered body as claimed in claim 1, wherein the powder making process for making the silicon carbide powder comprises:

solidifying a mixture of (1) a liquid silicon compound, (2) a liquid organic compound that produces carbon upon heating, and (3) a polymerization catalyst or a cross-linking catalyst, so as to obtain a solid product; and heating the solid product in a non-oxidizing atmosphere to carbonize the solid product and sintering the solid product in a non-oxidizing atmosphere.

10. A process for making a silicon carbide sintered body as claimed in claim 9, wherein the liquid silicon compound is ethyl silicate.

11. A process for making a silicon carbide sintered body as claimed in claim 9, wherein the non-metal-based sintering additive is a resol type phenol resin.

12. A process for making a silicon carbide sintered body, comprising:

providing a silicon carbide powder consisting essentially of silicon carbide particles that have an average particle diameter of 0.01 to 10 μm and are formed by the same powder making process;

mixing the silicon carbide powder with a sintering additive that consists essentially of a non-metal-based sintering additive to form a mixture; and hot pressing the mixture in a non-oxidizing atmosphere to obtain a silicon carbide sintered body having a density of 2.9 g/cm$^3$ or higher.

13. A process for making a silicon carbide sintered body as claimed in claim 12, wherein the mixture is hot pressed at a temperature of 2,000° C. to 2,400° C. and under a pressure of 300 to 700 kgf/cm$^2$.

14. A process for making a silicon carbide sintered body as claimed in claim 12, wherein the non-metal based sintering aid consists essentially of an organic compound that produces carbon upon heating.

15. A process for making a silicon carbide sintered body as claimed in claim 12, wherein the powder making process for making the silicon carbide powder comprises:

solidifying a mixture of (1) a liquid silicon compound, (2) a liquid organic compound that produces carbon upon heating, and (3) a polymerization catalyst or a cross-linking catalyst, so as to obtain a solid product; and heating the solid product in a non-oxidizing atmosphere to carbonize the solid product and sintering the solid product in a non-oxidizing atmosphere.

16. A process for making a silicon carbide sintered body as claimed in claim 12, wherein the silicon carbide sintered body has a total impurity content of 5 ppm or less.

17. A process for making a silicon carbide sintered body, comprising:

providing a silicon carbide powder consisting essentially of silicon carbide particles that have an average particle diameter of 0.01 to 10 μm and are formed by the same powder making process;

mixing the silicon carbide powder with a non-metal-based sintering additive to form a mixture; and hot pressing the mixture in a non-oxidizing atmosphere to obtain a silicon carbide sintered body that has a density of 2.9 g/cm$^3$ or higher and is free of boron.

18. A process for making a silicon carbide sintered body as claimed in claim 17, wherein the mixture is hot pressed at a temperature of 2,000° C. to 2,400° C. and under a pressure of 300 to 700 kgf/cm$^2$.

19. A process for making a silicon carbide sintered body as claimed in claim 17, wherein the non-metal based sintering aid consists essentially of an organic compound that produces carbon upon heating.

20. A process for making a silicon carbide sintered body as claimed in claim 17, wherein the powder making process for making the silicon carbide powder comprises:

solidifying a mixture of (1) a liquid silicon compound, (2) a liquid organic compound that produces carbon upon heating, and (3) a polymerization catalyst or a cross-linking catalyst, so as to obtain a solid product; and heating the solid product in a non-oxidizing atmosphere to carbonize the solid product and sintering the solid product in a non-oxidizing atmosphere.

21. A process for making a silicon carbide sintered body as claimed in claim 17, wherein the silicon carbide sintered body has a total impurity content of 5 ppm or less.

* * * * *